Dec. 5, 1967 F. F. BORKMANN ET AL 3,355,995

TAPE APPLYING APPARATUS AND METHOD

Filed Dec. 31, 1964 8 Sheets-Sheet 1

INVENTORS
FRANK FREDERICK BORKMANN
EUGENE CASSAI
BY
Frank P. Presta
ATTORNEY

INVENTORS
FRANK FREDERICK BORKMANN
EUGENE CASSAI
BY
Frank P. Presta
ATTORNEY

INVENTORS
FRANK FREDERICK BORKMANN
EUGENE CASSAI
BY
Frank P. Presta
ATTORNEY

INVENTORS
FRANK FREDERICK BORKMANN
EUGENE CASSAI
BY
Frank P. Presta
ATTORNEY

TAPE APPLYING APPARATUS AND METHOD

Filed Dec. 31, 1964 8 Sheets-Sheet 5

INVENTORS
FRANK FREDERICK BORKMANN
EUGENE CASSAI
BY
Frank P. Presta
ATTORNEY

INVENTORS
FRANK FREDERICK BORKMANN
EUGENE CASSAI
BY
Frank P. Presta
ATTORNEY

Dec. 5, 1967 F. F. BORKMANN ET AL 3,355,995

TAPE APPLYING APPARATUS AND METHOD

Filed Dec. 31, 1964 8 Sheets-Sheet 7

INVENTORS
FRANK FREDERICK BORKMANN
EUGENE CASSAI

BY

Frank P. Presta

ATTORNEY

INVENTORS
FRANK FREDERICK BORKMANN
EUGENE CASSAI
BY
Frank P. Presta
ATTORNEY

United States Patent Office 3,355,995
Patented Dec. 5, 1967

3,355,995
TAPE APPLYING APPARATUS AND METHOD
Frank Frederick Borkmann, Union, and Eugene Cassai, Cranford, N.J., assignors to American Can Company, New York, N.Y., a corporation of New Jersey
Filed Dec. 31, 1964, Ser. No. 424,471
43 Claims. (Cl. 93—1)

The present invention relates generally to a tape applying apparatus and method, and more particularly to a method and apparatus for applying a sealing tape over a slit in a container body blank.

It is an object of the present invention, therefore, to provide an improved method and apparatus for applying a sealing tape to a container body blank to cover and seal a slit in the blank.

Another object is the provision of such a method and apparatus wherein tapes may be heat-sealed to container body blanks at high speed and without damage to either the tapes or the blanks.

A further object is to provide an improved method and apparatus for feeding, folding and cutting a sealing tape in a predetermined manner, and for applying the folded and cut tape strip to a container body blank to cover and seal a slit therein.

Still another object is the provision of such a method and apparatus wherein the tape is folded in a predetermined manner prior to the cutting and without any interruption in the feeding thereof to provide a multi-thickness fold on one edge portion of the tape.

A still further object is to provide such a method and apparatus wherein the tape is cut into a strip having the folded edge portion on one end thereof to provide an easily grippable pull tab for the tape to facilitate its removal from the finished container.

Another object is the provision of a method and apparatus for applying a heat-sealable tape to a generally flat container body blank wherein a strip of predetermined width is cut from the tape and is transferred onto a tape application wheel in a novel manner.

Yet another object is the provision of such a method and apparatus wherein the tape is retained on the application wheel by a pressure differential, and is transferred therefrom onto a moving, heated body blank by removing the pressure differential as the wheel moves the tape into engagement with a predetermined portion of the heated blank.

A still further object is the provision of novel apparatus for feeding a heat-sealable tape, folding one edge of the tape back on itself in a predetermined manner, cutting the folded tape into a strip of a predetermined size having the folded edge at the leading end thereof, engaging the folded edge to transfer the tape onto a tape application wheel, retaining the tape on the wheel by a pressure differential, and transferring the tape from the wheel onto one surface of a heated container body blank to cover and seal a slit therein.

Numerous other objects and advantages of the invention will be apparent as it is better understood from the following description, which, taken in connection with the accompanying drawings, discloses a preferred embodiment thereof.

Referring to the drawings.

Figure 3:
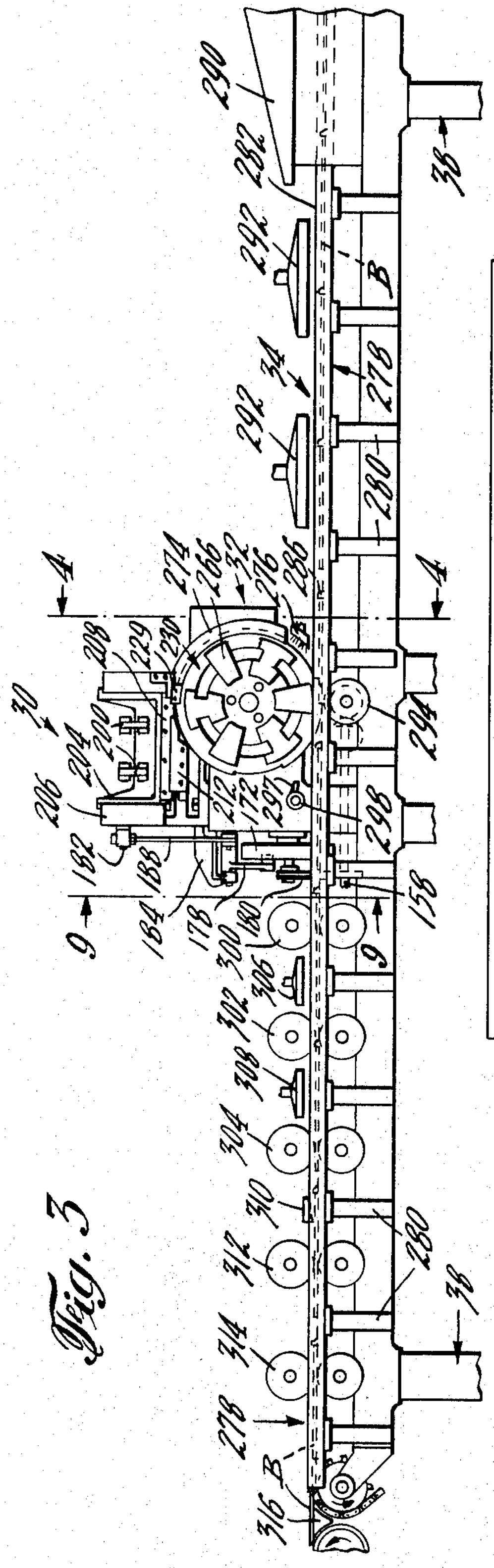
FIG. 3 is a front elevational view, with parts broken away, of an apparatus constructed in accordance with the principles of the instant invention.
Figure 4:
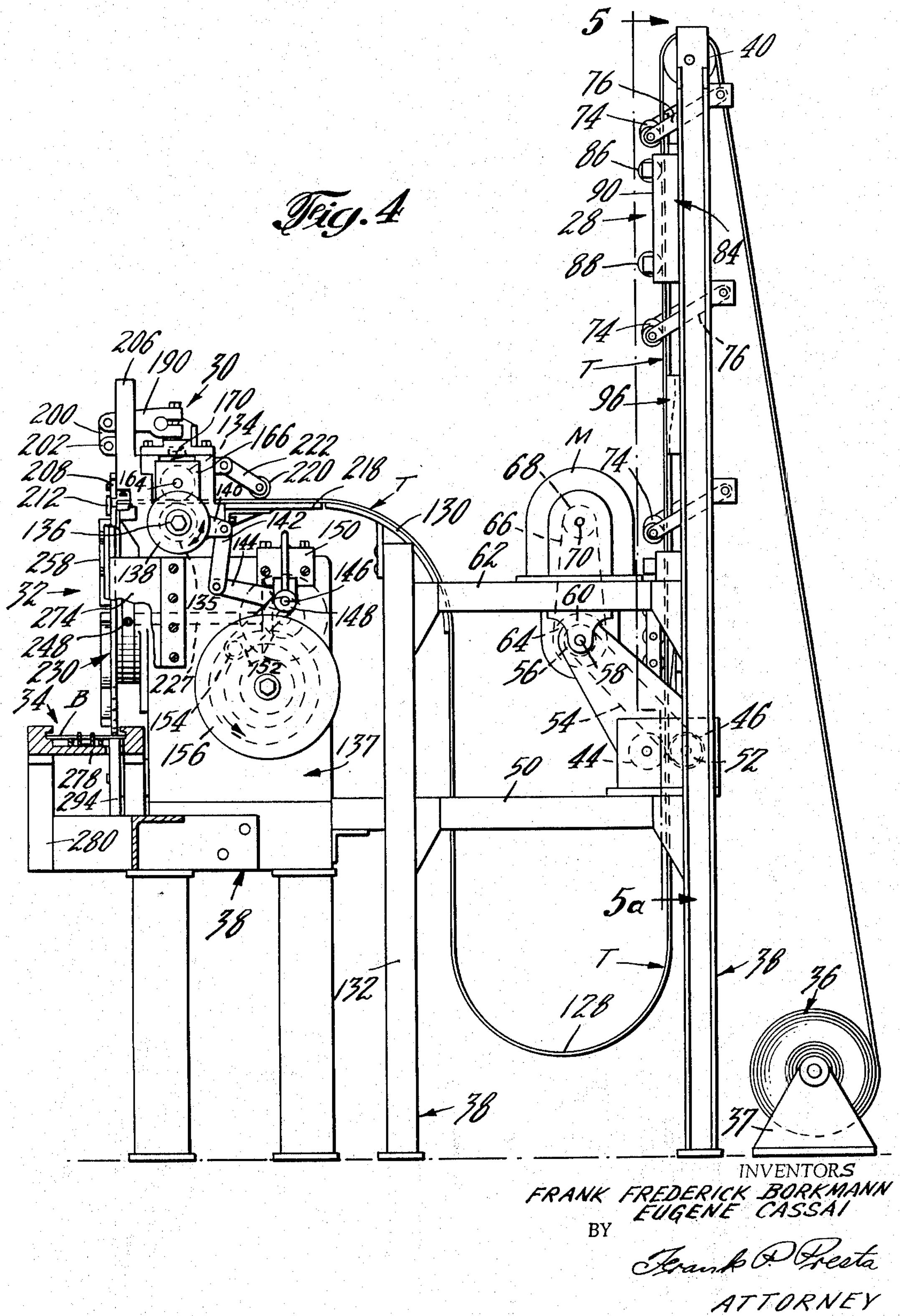
FIG. 4 is a side elevational view taken substantially along line 4—4 in FIG. 3, showing the tape folding, feeding, and cutting components of the instant apparatus.
Figure 5:
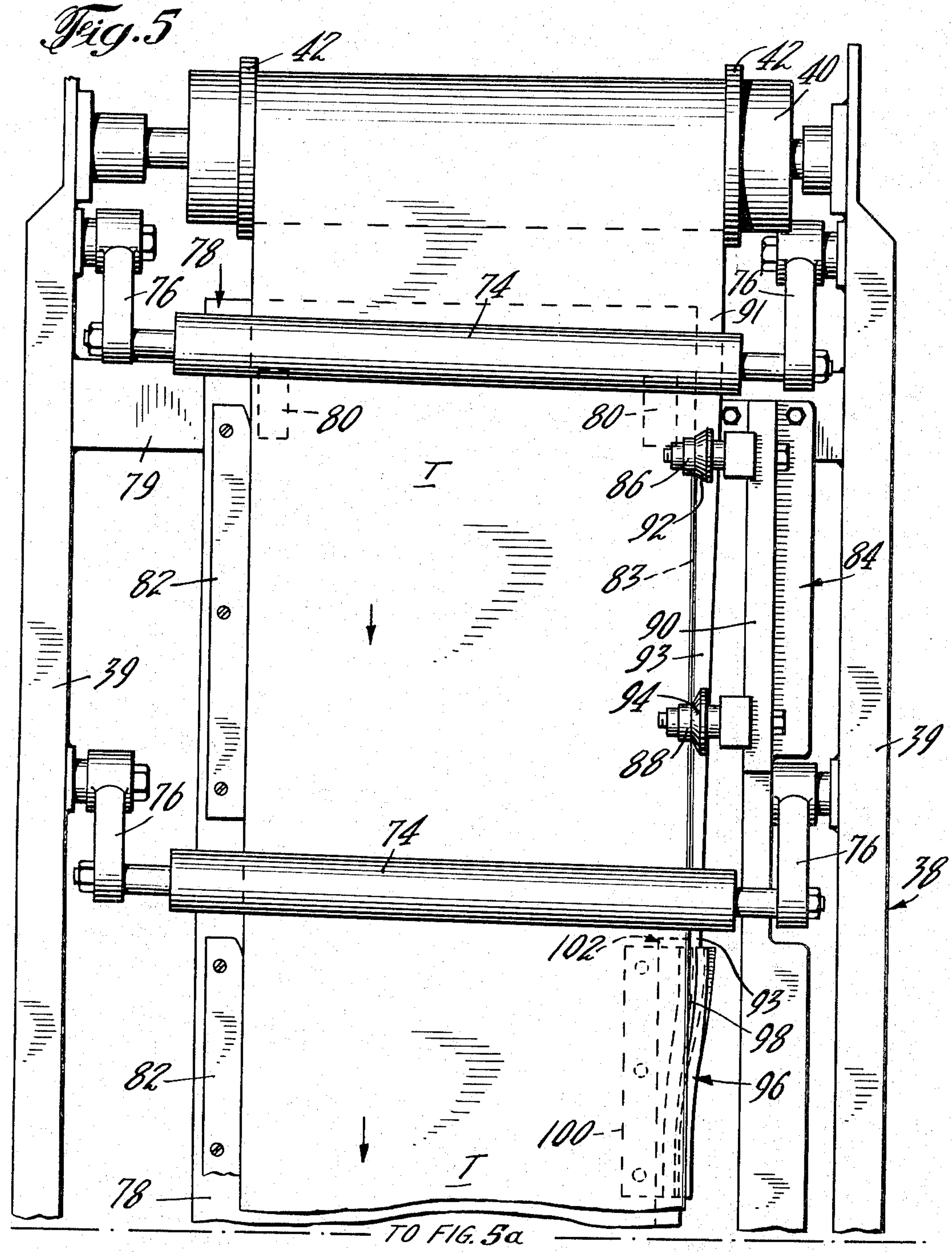
Figure 5A:
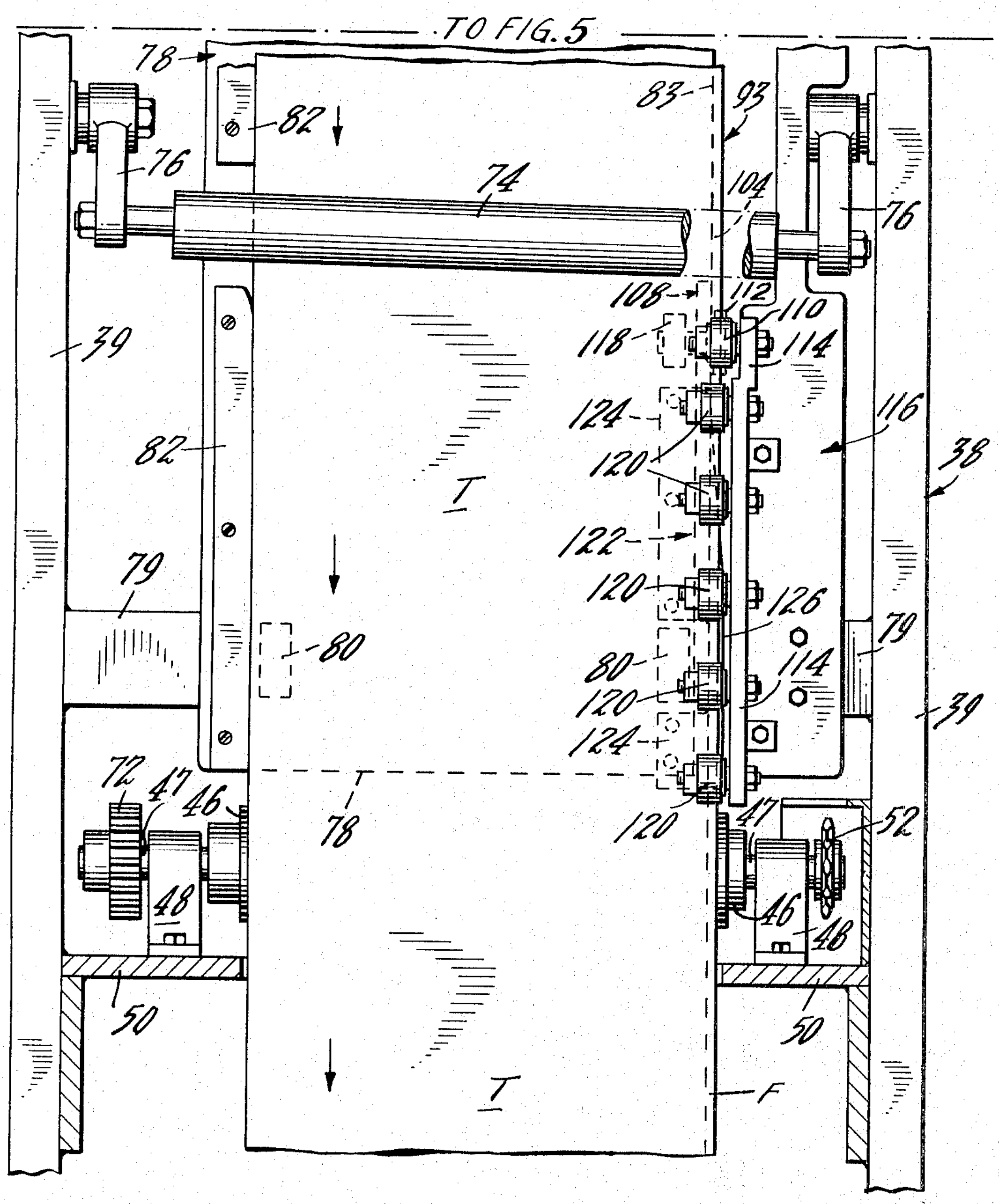
Figures 6, 7, 8:
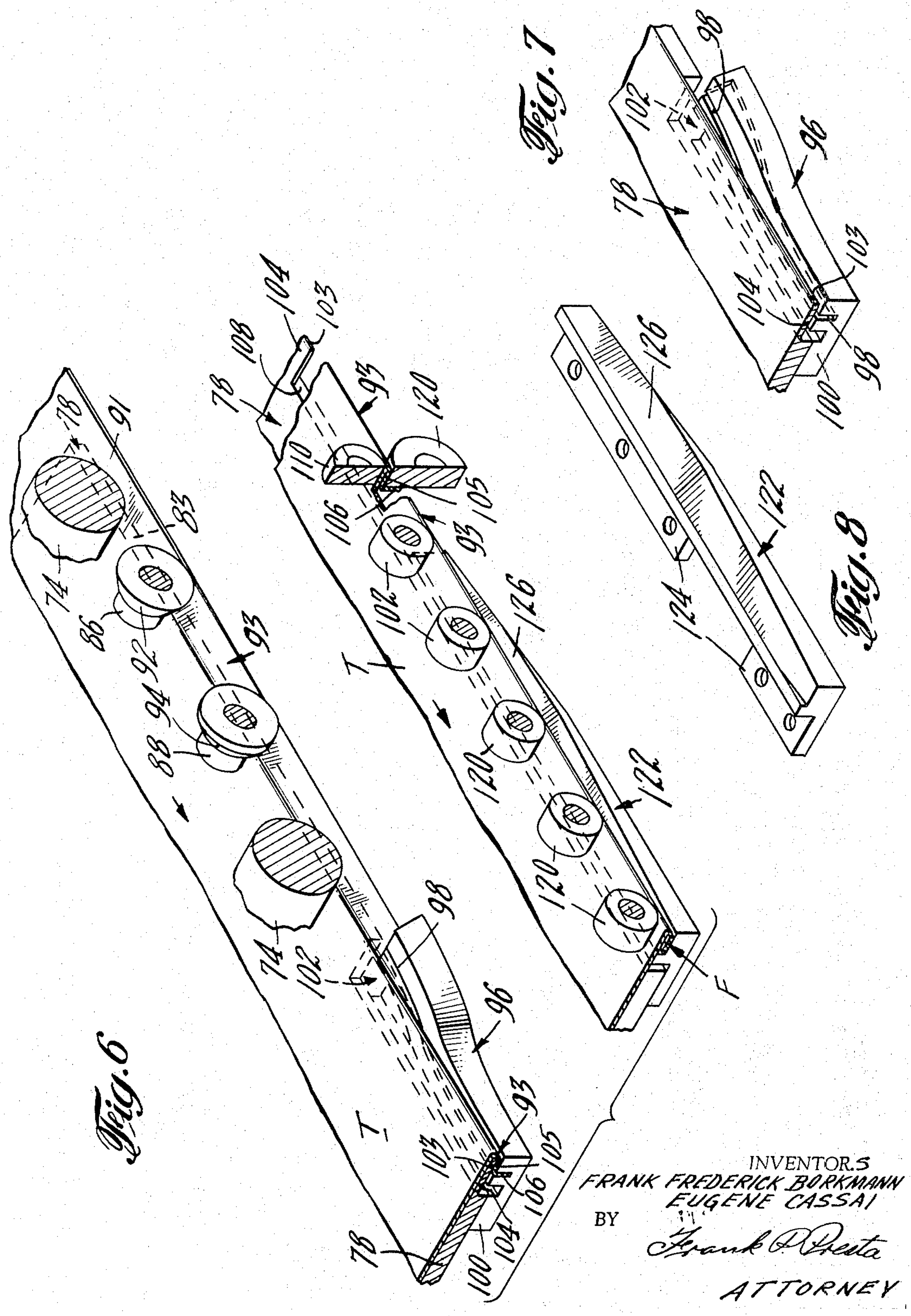
Figure 9:
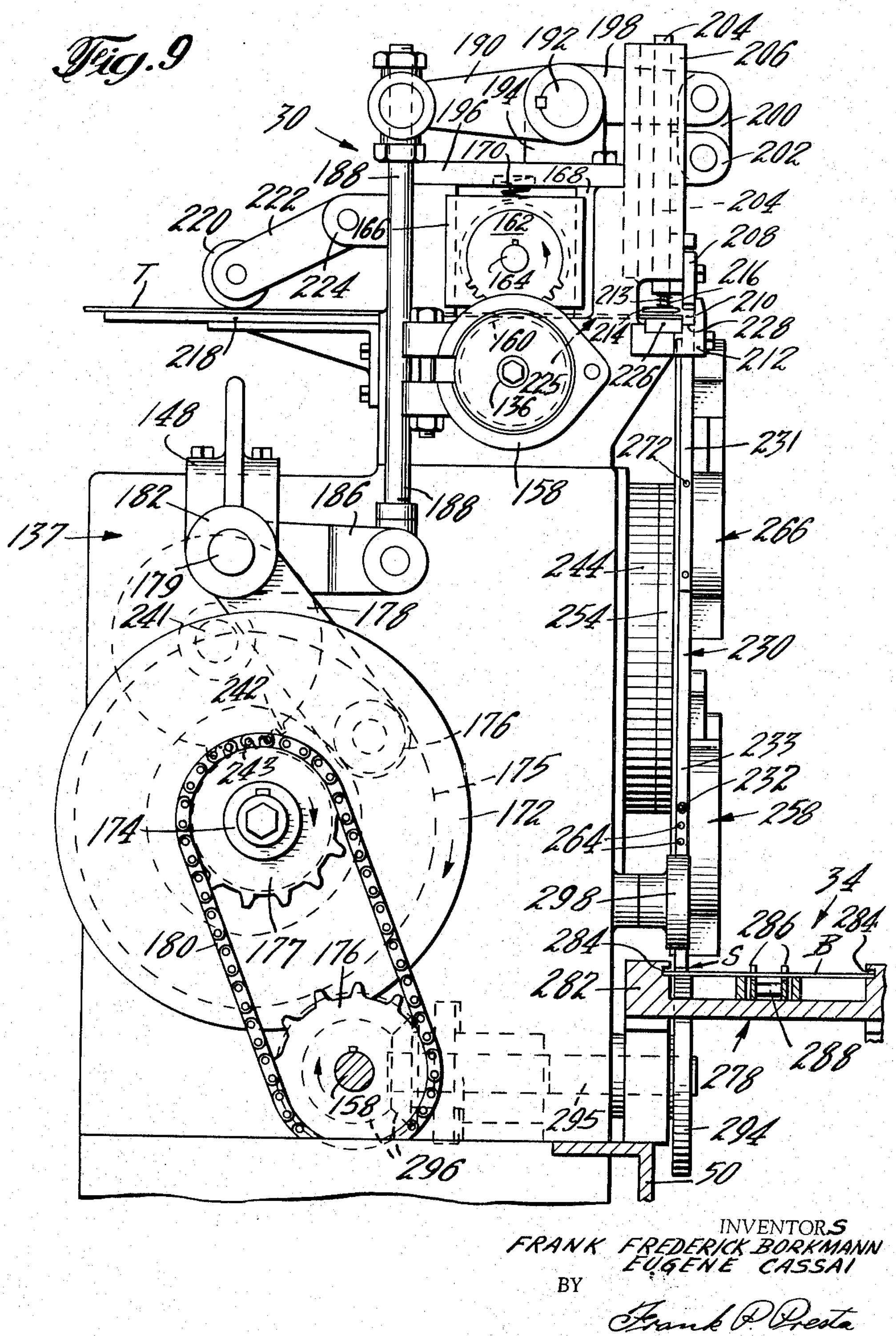
Figure 10:
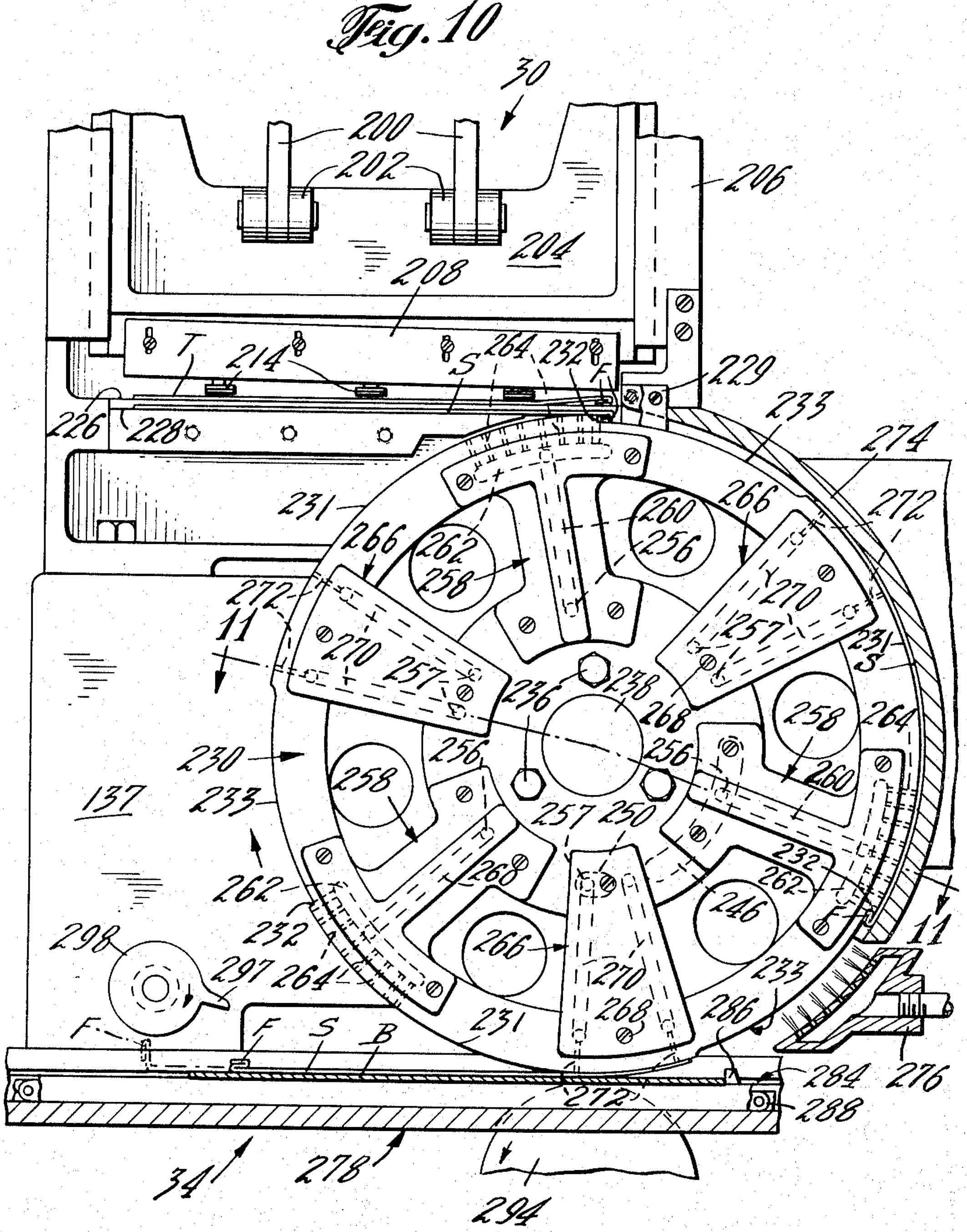
Figure 11:
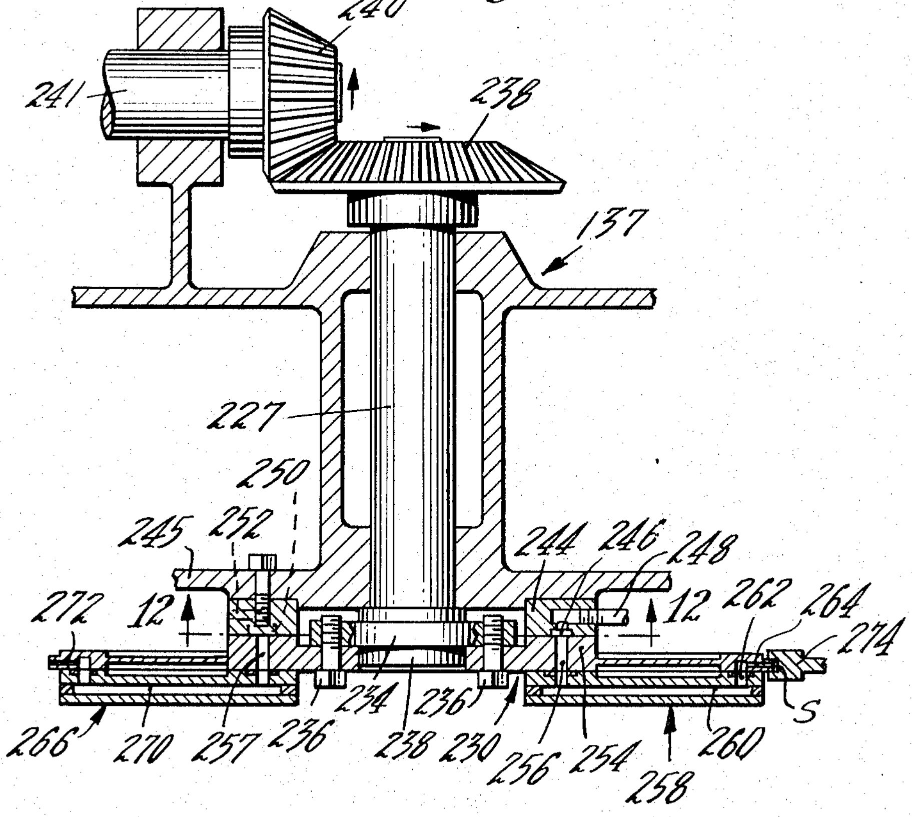
Figure 12:
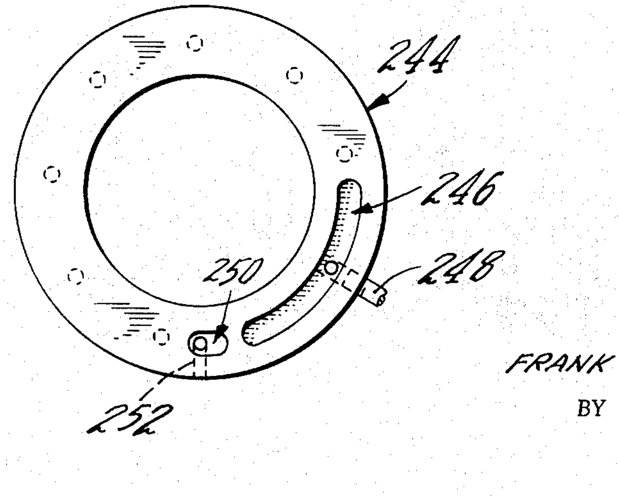

FIGS. 5 and 5*a* are elevational views taken substantially along lines 5—5—5*a*—5*a* of FIG. 4 showing the tape folding unit of the instant invention;

FIG. 6 is a perspective view of the folding table, tape folding, cam members and rollers which form a part of the folding unit of the instant apparatus;

FIG. 7 is a perspective view of a portion of the folding table and a first tape folding cam member shown in FIG. 6, showing the table and cam groove arrangement for initially forming a double fold in an edge portion of the tape;

FIG. 8 is a perspective view of a second tape folding cam member shown in FIG. 6 for tightly folding the edge portion of the tape in the tape folding unit;

FIG. 9 is a side elevational view, with parts broken away, taken substantially along line 9—9 in FIG. 3;

FIG. 10 is an enlarged front elevational view, with parts broken away, of the cutting unit and tape application wheel shown in FIG. 3;

FIG. 11 is a sectional view taken substantially along line 11—11 in FIG. 10; and FIG. 12 is a sectional view taken substantially along line 12—12 in FIG. 11.

Figure 1:
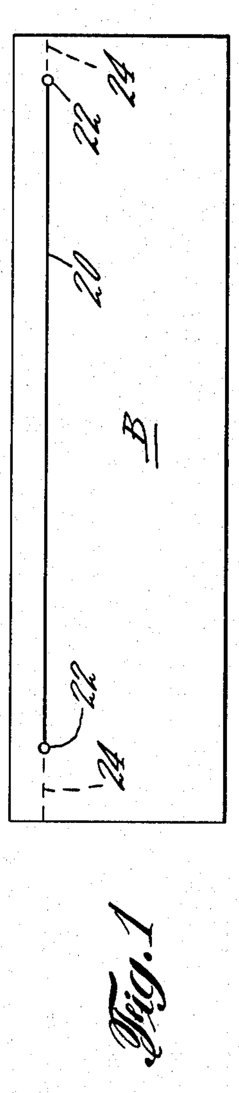
FIGURE 1 is a plan view of a container body blank of the type to which a tape strip may be applied by the method and apparatus of the instant invention.

There is illustrated in FIG. 1 a sheet metal container body blank B which is an example of one of the many types of members or blanks to which a tape strip can be applied by utilizing the instant method and apparatus. The blank B is provided with a longitudinal slit 20 adjacent one edge portion thereof which terminates at each end in an aperture 22. A score line 24 in alignment with the slit 20 is formed in the blank between each aperture 22 and the adjacent edge portion of the blank. The slit 20, apertures 22 and score lines 24 may be formed in the blank in any suitable manner, and their formation forms no part of the instant invention. A container formed from a blank B is disclosed in U.S. application S.N. 246,029 filed Dec. 20, 1962, now Patent No. 3,186,581.

Figure 2:
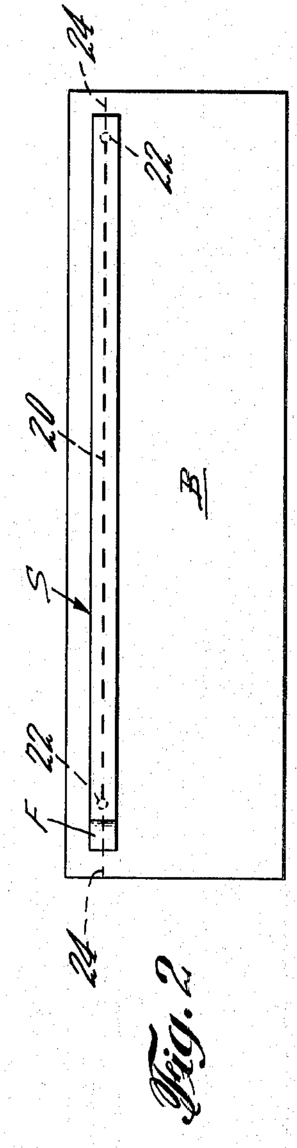
FIG. 2 is a view similar to FIG. 1 showing the body blank after the tape strip has been applied thereto in accordance with the method of the instant invention.

The apparatus of the instant invention is adapted to apply a strip S of sealing tape to the outer surface of the blank B to cover and seal the slit 20 and apertures 22 therein, as shown in FIG. 2. As an example which is not intended to be limiting the tape strip S may be formed of an outer layer of a flexible and relatively strong material, such as metallic foil or a suitable fibrous or plastic material, and an inner layer of a suitable adhesive having a relatively low peel resistance, such as a thermoplastic or pressure sensitive adhesive. For the purpose of explanation of the embodiment of the invention shown in the drawings, it will be assumed that the adhesive layer of the tape strip S is of the thermoplastic type. In accordance with the instant method, the tape T has one end thereof folded back on itself in a predetermined manner to provide a multi-thickness fold or pull tab F (see FIG. 2), as will be more fully explained hereinafter.

As a preferred or exemplary embodiment of the instant invention, there is shown in FIGS. 3 through 12 a tape applying machine constructed according to the principles of the instant invention, and comprising generally a tape folding unit 28, a tape cutting unit 30, a tape applying unit 32 and a blank conveyor unit 34.

As shown in FIG. 4, a supply roll 36 of sealing tape T is rotatably mounted on a stand 37 disposed adjacent the base of one of a pair of vertically extending frame members 39 (FIGS. 5 and 5*a*) which are part of a supporting frame 38 for the instant apparatus. Rotatably mounted on the upper ends of the frame members 39 is a guide roll 40 over which the tape T is fed from the supply roll 36. The guide roll 40 is provided with a pair of spaced, annular guide flanges 42 (not shown in FIG. 4) for maintaining the tape in a predetermined position thereon (see FIG. 5). The tape T is advanced over the guide roll 40 and through the folding unit 28 of the instant apparatus by a pair of feed rolls 44, 46 which are rotatably mounted on bearings 48 secured to frame members 50 (see FIG. 5*a*).

Rigidly secured to one end of the shaft 47 of the feed roll 46 is a drive sprocket 52 on which one end of a drive chain 54 is mounted. The other end of the drive chain 54 is mounted on a sprocket 56 (see FIG. 4) which is secured to a shaft 58 that is rotatably mounted in a depending bracket 60 which is secured to a horizontal frame member 62. The shaft 58 has a second sprocket 64 rigidly mounted thereon which is driven by a conveyor chain 66 having the other end thereof in engagement with the sprocket 68 which is keyed to a drive shaft 70 which is driven in a counterclockwise direction (as shown in FIG. 4) in any suitable manner such as by a motor M.

The other end of the guide roll shaft 47 has a gear 72 (see FIG. 5*a*) rigidly mounted thereon which meshes with an identical gear (not shown) on the shaft of the adjacent feed roll 44. Thus, it will be readily seen that the motor M and drive shaft 70 serve to rotate the guide rolls 44 and 46 in a clockwise and counterclockwise direction, respectively, to advance the tape T downwardly therebetween and through the folding unit 28.

The folding unit 28 comprises a plurality of vertically spaced, free-wheeling rollers 74 which are rotatably mounted on brackets 76 pivotally mounted on the frame members 39. These rollers 74 serve to maintain the tape T in engagement with a vertically extending support table 78 which is mounted on the support frame 38 (see FIGS. 4, 5, and 5*a*). The table 78 is provided with generally transversely extending supports 80 which are secured to cross members 79 of the support frame 38 to maintain the table in a predetermined spaced relation to the frame 38. Mounted on one side of the table 78 are a plurality of side gauge plates 82 which are disposed in longitudinal alignment with one of the guide flanges 42 on the guide roll 40 to gauge the adjacent edge of the tape T as it moves from the guide roll 40 over the table 78. The rollers 74 also serve to maintain the tape T in a gauged position in engagement with the side gauge plates 82.

The side of the tape T opposite to that which is in engagement with the side gauge plates 82 extends beyond the adjacent edge 83 of the table 78, as shown in FIG. 5. Mounted adjacent this side of the tape T and disposed between the two uppermost rollers 74, is a generally L-shaped plate 84 which is secured to the frame member 79. A pair of rollers 86 and 88 are rotatably mounted in vertically spaced relation in any suitable manner on the transverse leg 90 of the plate 84 and are disposed closely adjacent the edge 83 of the table 78. The upper roller 86 is provided with a tapered annular surface 92 which is so positioned as to engage the side portion 91 of the tape T which extends beyond the edge 83 of the table 78. The tapered surface 92 of the roller 86 engages this unsupported side portion 91 of the tape T and bends it backwardly around the edge 83 of the table 78 through an angle of approximately 30° as the tape T is advanced on the table to initiate the formation of a fold 93 therein (see FIGS. 5 and 6). In a similar manner, the second roller 88 is provided with a tapered annular surface 94 which engages the fold 93 in the tape T and further bends it around the edge 83 of the table 78 through an additional angle of approximately 30°, thereby causing the fold 93 in the unsupported portion of the tape to extend backwardly from the portion of the tape on the table 78 at an angle of approximately 60°.

The tape T then is advanced under the second free wheeling roller 74 and over a cam plate or member 96 having a curved and tapered cam slot 98 therein into which the tape fold 93 is advanced. The cam member 96 is provided with a mounting flange 100 of reduced thickness which is secured in any suitable manner to the adjacent surface of the table 78. The cam member 96 extends into an undercut portion 102 in the table 78 so that the cam slot 98, which is initially inclined at a 60° angle to receive the fold 93, initially is disposed in substantial alignment with the side edge 103 of the residual, thin edge portion 104 of the table (see FIGS. 6 and 7). As the tape T is advanced along the table 78, the fold 93 in the slot 98 in cam member 96 is cammed inwardly by the slot 98 which is contoured to move inwardly of the edge 103 of the portion 104 and to increase its slope from 60° to 90° relative to the table 78. As a result, the inner half 105 of the fold 93 is bent tightly around the edge 103 of the thin edge portion 104 of the table and into parallelism with the tape T, and its outer half is formed into a folded portion 106 which extends generally at right angles to the tape T (see FIG. 6).

As shown in FIGS. 5*a* and 6, the tape T thereafter is advanced along the table 78 and under the lowermost roller 74 to a point wherein the thin edge portion 104 of the table terminates, the table thereafter being provided with an inset side edge 108 beyond which the folded portions 105 and 106 of the tape T extend. The folded tape portion 105 and the adjacent edge portion of the tape are further advanced between a pair of rollers 110 and 112 which serve to tightly press the fold 105 and the tape edge portion together. The upper roller 110 is rotatably mounted in any suitable manner on the transverse leg 114 of a support plate 116 mounted on the cross member 79 of the support frame 38, while the lower roller 112 is rotatably mounted in a bearing 118 secured to one surface of the table 78.

A plurality of rollers 120 are rotatably mounted in substantially equally vertically spaced relation on the transverse leg 114 of the plate 116 below the rollers 110 and 112. Disposed adjacent the rollers 120 and the side edge 108 of the table 78, is a second cam member 122 (see FIGS. 6 and 8) which is provided with mounting flanges 124 that are secured to one surface of the table 78. The cam member 122 is provided with a cam surface 126 which, at the supper end thereof, initially extends substantially normally to the plane of the tape T on the table 78 and then gradually reduces its angle of inclination to the tape plane until the surface 126 is approximately parallel to the plane of the tape at the lowermost point of the cam member 122. As the folded edge portion of the tape T is advanced between the rolls 120 and the cam member 122, the cam surface 126 engages the right-angled tape fold portion 106 and serves to bend it towards the fold portion 105 and into tight engagement therewith so as to form a double reverse fold F in the side edge portion of the tape T, as clearly shown in FIG. 6.

After the formation of the tape fold F, the tape T is advanced by the feed rolls 44, 46 out of the folding unit 28 of the instant apparatus, and then downwardly and upwardly through a loop 128 onto a curved ramp 130 secured to a frame member 132 and towards the cutting unit 30. In accordance with conventional practice, the loop 128 may be maintained between predetermined levels by any suitable means, such as photoelectric cells (not shown), which control the operation of the motor M and thus the rotation of the feed rolls 44, 46.

As shown in FIGS. 4 and 9, the cutting unit 30 comprises a pair of feed rolls 134, 135 which advance the leading portion of the tape T therethrough. The lower feed roll 135 is secured to a shaft 136 which is rotatably mounted in any suitable manner on a portion of a housing 137 supported on the frame 38. Mounted on one end of the shaft of the lower roll 135 is a one-way clutch 138 of any suitable or conventional construction which serves to transfer power in only a counterclockwise direction (as seen in FIG. 4). The clutch 138 is provided with a lug 140 to which one end of a first link 142 is pivotally connected. The other end of the link 142 is pivotally connected to the adjacent end of a second link 144 that has its opposite end keyed to a shaft 146 which is rotatably mounted in a bearing portion 148 of a bracket 150 secured to an adjacent portion of the housing 137. A third link 152 has one end thereof keyed to the shaft 146 and has the other end thereof provided with a rotatable cam roller 154 which is disposed in a groove of a rotatable face cam member 156 which is driven in a counterclockwise direction in any suitable manner such as from the main drive shaft 158 (FIG. 9) for the instant apparatus.

The cam groove of the rotatable cam member 156 is so constructed that the cam roller 154 of link 152 is caused to move upwardly and downwardly in a uniform and intermittent manner to thereby oscillate the shaft 146 and the link 144. The link 142 connected to the clutch hub 140, therefore, reciprocates in a generally vertical direction to thus effect an intermittent rotation of the lower feed roll 135 in a counterclockwise direction through the one-way clutch 138.

Mounted on the other end of the shaft 136 of the lower feed roll 135 is a brake 158 of any suitable or conventional construction (see FIG. 9) which serves to prevent movement of the roll 135 other than when it is rotated by movement of the links 142, 144, 152 which is transferred through the one-way clutch 138, as hereinbefore explained. A gear 160 is mounted on the shaft 136 of the lower roll 135 adjacent the brake 158 and meshes with a gear 162 mounted on the shaft 164 on which the upper guide roll 134 is mounted. The intermittent counterclockwise rotation (as seen in FIG. 4) of the lower roll 135, therefore, serves to rotate the upper roll 134 in a clockwise direction (as seen in FIG. 4) through the gears 160 and 162. The ends of the shaft 164 of the upper roll 134 extend through apertures formed in slide blocks 166 disposed on either side of the upper roll 134. Each slide block 166 is slidably mounted within a slideway 168 mounted on the housing 137 and is biased downwardly by a coil spring 170 (see FIGS. 4 and 9). The purpose of the spring biased blocks 166 is to press the driven, upper feed roll 134 into tight engagement with the driving, lower feed roll 135.

Referring now to FIG. 9, a second rotatable cam member 172 is mounted on a shaft 174 which is rotatably driven in a clockwise direction by the main drive shaft 158 through a pair of sprockets 176 and 177 and a drive chain 180 in engagement therearound. The cam member 172 comprises an eccentric cam groove 175 in which a rotatable cam roller 176 is disposed. The roller 176 is rotatably mounted on one end of a link 178 which has the other end thereof secured to a shaft 179 which in turn is rotatably mounted within a bearing portion 182 of a bracket 184 secured to the housing 137. A second link 186 has one end thereof secured to the shaft 180 so as to oscillate with the link 178 and shaft 179. The other end of the link 186 is pivotally connected to the lower end of a connecting rod 188 that is slidably disposed for substantially vertical reciprocation in an upper portion of the housing 137. The upper end of the connecting rod 188 is pivotally connected to one end of a link 190 which is secured to a shaft 192 that is rotatably mounted on a pair of bearing members 194 mounted on a supporting plate 196 that is secured in any suitable manner to the housing 137.

Also keyed to the shaft 192 in spaced relation to the link 190 are a pair of links 198. Each of these links 198 is pivotally connected at its opposite end to one end of a relatively small, downwardly extending connecting link 200. The other end of each connecting link 200 is pivotally connected to a clevis 202 which is rigidly secured to a slide member 204 that is mounted for vertically reciprocable movement in a frame 206 supported on the housing 137 (see FIG. 9).

It will be readily seen, therefore, that rotation of the cam member 172 results in oscillation of the links 178, 186 and reciprocation of the connecting rod 188. This vertical movement of the rod 188 is transferred to the slide member 204 by the links 190, 198 and 200, as hereinbefore explained. The slide member 204 is thus vertically reciprocated in the frame 206 in response to rotation of the cam member 172.

A shearing knife 208 is secured in any suitable manner to the lower portion of the slide member 204 and is adapted to be received within the recess 210 of a gauge plate 212 secured to the housing 137. Slidably mounted in any suitable manner in the lower portion of the slide member 204 are the supporting rods 213 of a plurality of pressure pads 214 which are biased downwardly to a position in spaced relation to the bottom of the slide member by coil springs 216 surrounding the rods 213. For a reason which will be apparent hereinafter, the pressure pads 214 in their spring-biased, lowermost position are lower than the cutting edge of the cutting knife 208.

The tape T is intermittently advanced by the feed rolls 134, 136 of the cutting unit 30 over the ramp 130 and onto a supporting plate 218 secured to the upper portion of the housing 137. The tape T is maintained in close contact with the upper surface of the supporting plate 218 by a free wheeling roller 220 which rests on the upper surface of the tape T. The roller 220 is rotatably mounted on and between the lower ends of a pair of brackets 222 which are pivotally connected at the other ends thereof to a pair of lugs 224 connected in any suitable manner to the upper portion of the housing 137.

The leading portion of the tape T is advanced by the feed rolls 134, 135 over the supporting plate 218, a flat feed table 225, and a cutting table or plate 226, under the pads 214 and the knife 208, and into engagement with the gauge plate 212. At this point, the portion of the tape T on the cutting table 226 is engaged by the pressure pads 214 on the slide member 204 as it moves downwardly within the frame 206, and the portion of the tape T extending beyond the cutting table 226 is severed from the main portion of the tape T by the cutting knife 208 to form a transverse strip S having the fold F on one end thereof. As the tape strip S is separated from the tape T it falls downwardly onto a platform 228, which is formed integral with the gauge plate 212 and is disposed below the upper surface of the cutting table 226.

It will be noted, of course, that the reciprocation of the slide member 204, and thus that of the cutting knife 208 and pressure pads 214, is in synchronization with the intermittent movement of the feed rolls 134, 135 so that the leading portion of the tape T is gripped by the pressure pads 214 and cut by the knife 208 after it engages the gauge plate 212. The tape T is then released by the pressure pads 214 as the slide member 204 moves upwardly prior to the next advancement of the tape by the rolls 134, 135. As seen in FIG. 10, the cutting knife 208 is preferably mounted in a tilted position for the purpose of gradually engaging the tape T to aid in the shearing of the strip S from the leading portion thereof.

Referring now to FIGS. 10 through 12, it will be seen that the end portion of the tape strip S having the fold F extends beyond the right hand end of the platform 228 of the gauge plate 212. This folded end portion of the tape strip is gauged by an auxiliary gauge plate 229 (FIG. 10) which is secured in any suitable manner to the slide frame 206 and forms a continuation of the front gauge 212. As each tape strip S is cut and falls onto the platform 228, the folded end portion of the strip falls onto the outer peripheral surface of a rotating tape application wheel 230 which is part of the tape applying unit 32 of the instant apparatus. The outer surface of the wheel 230 is provided with a plurality of raised, equally spaced portions 231 which may be formed on the wheel by providing depressed, circumferentially extending areas 233 in its outer surface (see FIG. 10). Each of these raised wheel portions 231 is formed with a radially extending leading step edge 232 which serves to engage the depending fold F of a tape strip S on the platform 228 as the wheel 230 rotates in a clockwise direction, as seen in FIG. 10, to thereby mechanically engage and pull the strip S laterally from the platform 228 and onto the outer surface of the associated raised portion 231 of the wheel. Thus, the step edge 232 functions in the manner of a feed dog to advance the strip S with the wheel 230.

The wheel 230 is secured to and rotatably driven by a shaft 227 having an end flange 234 to which the wheel is connected by bolts 236 (see FIG. 11). The shaft 227 is provided with a hub 238 which facilitates the positioning of the wheel 230 on the shaft 227. The shaft 227 is rotatably mounted on a portion of the support frame 137 and is driven through a pair of miter gears 238, 240 by a drive shaft 241 that may be connected to the main drive shaft 158 through gears 242–243, or driven in any other suitable manner. It will be noted that the rotation of the wheel 230 is in synchronization with the intermittent feeding and cutting of the tape T in the cutting unit 30, and thus a step edge 232 on the outer surface of the wheel will be in a position to engage the fold F of each tape strip S as it falls onto the platform 228 after each cutting operation, as clearly shown in FIG. 10.

As shown in FIGS. 11 and 12, a stationary manifold ring 244 is fixed to a member 245 of the frame 137 and is formed with an arcuate, elongated port 246 which is in communication with a source of vacuum (not shown) through a vacuum line 248. The ring 244 is also provided with a relatively small port 250 adjacent to one end of and spaced in a clockwise direction from the channel 246 (as seen in FIG. 12). The port 250 is vented to the atmosphere through a vent bore 252. The tape wheel 230 is provided with an annular portion 254 which is of substantially the same size as the ring 244 and in rotary slidable engagement therewith. The annular wheel portion 254 contains a predetermined number of apertures or ports 256, 257 therethrough which are so positioned as to communicate with the ports 246 and 250 in the ring 244 as the wheel 230 rotates.

Disposed adjacent the leading end of each raised portion 231 on the outer surface of the wheel 230 is a vacuum plate 258 which is secured to the web of the wheel 230 in sealing engagement therewith (see FIGS. 10 and 11). Since there are three raised portions 231 provided on the outer surface of the wheel 230 in the illustrated embodiment of the invention, there are three vacuum plates 258 provided in substantially equally spaced relationship on the wheel 230. Each of these vacuum plates 258 is provided with a generally radially outwardly extending bore 260 which terminates at its outer end in communication with a generally circumferentially extending, curved channel 262. The inner end of the bore 260 is in communication with one of the ports 256 formed in the annular portion 254 of the wheel 230, and the channel 262 in each vacuum plate 258 is disposed in communication with a plurality of generally radial bores 264 extending outwardly through the wheel 230 to the outer surface thereof.

Interposed between the vacuum plates 258 are a second set of three, substantially equally spaced vacuum plates 266 which are secured to the web of the wheel 230 in sealing relationship therewith in any suitable manner, such as by bolts 268 and disposed adjacent the trailing edges of the raised wheel portions 231.

Each of the vacuum plates 266 is provided with a pair of generally radially outwardly extending bores 270 which have the inner ends thereof in communication with the ports 257 in the annular portion 254 of the wheel 230. The outer end of each bore 270 is in communication with a generally radially outwardly extending bore 272 which extends through the wheel 230 to the outer surface thereof.

It will be noted, therefore, that the three series of bores 264 in the outer surface of the wheel 230 are in communication with the ports 256 in the annular wheel portion 254 through the vacuum plates 258; and the bores 272 in the outer surface of the wheel 230 are in communication with the ports 257 in the annular wheel portion 254 through the vacuum plates 266 (see FIGS. 10, 11 and 12).

As the tape application wheel 230 rotates in a clockwise direction and the tape strip S is pulled thereon by the engagement of the step edge 232 with the tape fold F, the forward portion of the tape strip is disposed over the bores 264 in the outer surface of the wheel, and the rear portion of the tape strip is disposed over the bores 272 in the outer surface of the wheel (see FIG 10). The tape strip S is advanced in a clockwise direction on the outer surface of the wheel 32, and it is maintained thereon through approximately the first 90° of rotation by a curved guide shoe 274 which surrounds the right side of the tape wheel 230 (as seen in FIG. 10). As the leading portion of each tape strip S on the wheel 230 reaches the lower portion of the guide shoe 274, the ports 256 in the annular wheel portion 254 pass over the vacuum port 246 in the fixed ring 244 and thus a vacuum is created in the bore 260 and channel 262 of the adjacent vacuum plate 258, as well as in the plurality of bores 264 in the outer surface of the wheel 230. This creates a pressure differential across the leading portion of the tape strip S and serves to retain this portion of the tape strip on outer surface of the wheel 230 as the tape strip moves beyond the guide shoe 274.

Similarly, as the rear portion of each tape strip S reaches the lower end of the guide shoe 274, the ports 257 in the annular wheel portion 254 are brought into communication with the vacuum port 246 in the fixed ring 244. A vacuum in thus applied through the bores 270 in the adjacent vacuum plate 266 to the bores 272 in the outer surface of the wheel 230 to retain the rear portion of the tape strip S on the wheel 230 as it leaves the guide shoe 274.

As each tape strip S is carried by the wheel 230 beyond the guide shoe 274, the outer surface of the strip is heated in any suitable or conventional manner, such as by a gas heater 276 to soften the thermoplastic adhesive which forms the outer layer of the tape strip S, as hereinbefore explained. The tape is then advanced on the wheel 230 towards the container blank conveyor unit 34 of the instant apparatus.

The conveyor unit 34 (see FIGS. 3, 9 and 10) comprises an elongated guide member 278 supported on a plurality of generally vertically extending support posts 280 which are part of the frame 38. The guide member 278 is provided with upwardly extending sides 282 having channels 284 (see FIG. 9) therein in which container body blanks B, such as that shown in FIG. 1, are slidably disposed. The container body blanks B are advanced along the guide member 278 by raised feed dogs 286 which are mounted on a conveyor chain 288 and engage the rear edge of the blanks B. The conveyor chain 288 may be driven in any suitable manner, and preferably is connected to the main drive shaft 158 of the instant apparatus.

When the adhesive layer of the tape T is of the thermoplastic type, each blank B is heated in an oven 290 and by spaced heating units 292 of any suitable type as it is moved along the guide member 278 prior to reaching the tape application wheel 230 as shown in FIG. 3. The blanks B preferably are heated to a temperature which is sufficiently high to insure adhesion of the thermoplastic adhesive layer of the tape to the blank, without resulting in degradation of the particular adhesive used.

The movement of the conveyor chain 288 and thus that of the blanks B along the guide member 278 is synchronized with the rotation of the tape application wheel 230 so that each blank B reaches the wheel 230 just as the forward portion of a tape strip S on the outer surface of the wheel approaches the guide member 278. The blanks B are so positioned that the leading, folded edge of the tape strip S will engage the blank just forwardly of the leading aperture 22 therein and in alignment with the slit 20 in the blank.

As the leading edge of each tape strip S so approaches each blank B, the port 256 of the annular wheel portion 254 passes over the venting port 250 in the stationary ring 244 to vent the vacuum in the plurality of bores 264 in the outer surface of the wheel to the atmosphere, thereby serving to release the portion of the tape strip S over these bores 264 from the outer surface of the wheel 230. Similarly, as the rear portion of each tape strip S over the bores 272 in the wheel 230 approaches a blank B, the ports 257 in the annular wheel portion 254 pass over the venting port 250 in the stationary ring 244 to thereby vent the vacuum in the wheel bores 272 to the atmosphere and release the rear portion of the tape strip S.

Since the thermoplastic adhesive on the outer surface of each tape strip S is softened by the heater 276, and because the blanks B are heated, each tape strip S engages and becomes adhered to the upper surface of the adjacent blank B, and is pressed into sealing relationship therewith as they pass between the outer surface of the tape wheel 230 and a lower pressure wheel 294. The tape strip S thus covers and seals the apertures 22 and the slit 20 in the blank B as shown in FIG. 2. The lower wheel 294 is rotated in a counterclockwise direction (as seen in FIG. 10) by a shaft 295 which is connected through a series of gears 296 to the main drive shaft 158 (see FIG. 9).

As each blank B and the tape strip S thereon are advanced by the conveyor chain 288 beyond the nip of the wheels 230 and 294, the fold F on the leading edge of each tape strip is engaged by a finger 297 of a wheel 298 which is rotated in a clockwise direction (as seen in FIG. 10) in any suitable manner. The finger 297 serves to lift the fold F away from the tape strip S until it extends substantially perpendicularly therefrom, as shown in broken lines in FIG. 10. This lifting of the fold F can be accomplished in any other suitable manner, such as by air pressure means or another type of mechanical device. The purpose of lifting the fold F away from the underlying portion of the tape strip S is to insure that this underlying strip portion will be firmly adhered to the container body blank B, as will be more fully explained hereinafter.

As each blank B and tape strip S thereon are advanced beyond the lifting wheel 298, they are passed between three pairs of counter-rotating rolls 300, 302 and 304 of any suitable construction which are disposed in spaced relation along the path of the blanks B in the guide member 278. A heating unit 306 of any suitable type is disposed between the pairs of rolls 300 and 302, and a similar heating unit 308 is disposed between the pairs of rolls 302 and 304. The rolls 300, 302 and 304, therefore, serve to tightly press the tape strip S onto the blank B as they are maintained in a heated condition by the heating units 306 and 308. It is noted that the upper rolls of each of these pairs of rolls 300, 302 and 304 are cut out or notched in any suitable manner to accommodate the lifted fold F on the leading edge of the tape strip S, so that the portion of the tape strip immediately behind the fold F is heated and tightly pressed into sealing relationship with the adjacent portion of the blank B.

After passing through the series of rolls 300, 302 and 304, the upstanding fold F is wiped down into engagement with the adjacent portion of the tape strip S by a cam 310 mounted above the guide channel 278 (see FIG. 3). The wiped down fold F provides a pull tab of double thickness which is not adhered to the underlying portion of the strip S and facilitates the removal of the strip S from a finished and packed container by the consumer.

Thereafter, each blank B and the tape strip S thereon are passed through a pair of rubber rolls 312 and a pair of cooled rolls 314 of any suitable type to firmly set the adhesive on the tape strip S. The blanks then are conveyed onto a support plate 316 from which they may be transferred to another conveyor 318 for subsequent operations thereon, such as conventional body-making and side seam-forming operations.

It is noted that the instant method and apparatus may be utilized to apply a strip of tape of any desired type to any suitable type of member which is relatively flat, and thus is not limited to the application of a tape having an adhesive layer to a container body blank.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A method of applying a strip of tape to an article, so that one end portion is folded to serve as a pull tab, comprising the steps of:
- advancing the tape along a predetermined path which is substantially parallel to its longitudinal axis,
- folding one side edge portion of the tape as it is advancing,
- cutting a transverse strip from the leading portion of the tape, said strip having the folded edge portion of the tape disposed at one end thereof,
- engaging said folded end of the cut strip to convey said strip toward said article,
- placing said tape strip on said article in a predetermined position thereon, and
- adhering the unfolded portion of the tape to said article.

2. The method of claim 1 wherein said one side edge portion of said tape is folded into a reverse fold in engagement with the adjacent portion of said tape.

3. The method of claim 1 wherein said transverse strip is sheared from said tape while its advancement is temporarily stopped.

4. The method of claim 1 wherein said strip is conveyed toward said article in a generally circular path, while said article is moving in a generally linear path.

5. A method of applying a strip of tape having an adhesive layer to a moving article, comprising the steps of:
- advancing the tape longitudinally along a predetermined path,
- folding one side edge portion of the tape reversely upon itself as it is advancing,
- shearing a transverse strip from the leading portion of the tape while its advancement is temporarily stopped, said strip having the folded tape portion disposed on one end thereof,
- engaging said folded end of the cut strip with the outer surface of a rotating member to pull the strip thereon,
- conveying said strip on said rotating member toward said moving article,
- placing said tape strip on said article in a predetermined position thereon with said adhesive layer in engagement with said article, and
- pressing said tape strip into tight engagement with said article so that it becomes firmly adhered thereto.

6. The method of claim 5 wherein said side edge portion of said tape is folded into a double reverse fold which is formed by first forming said side edge portion into a first reverse fold and a second transverse fold, and then pressing said transverse fold into engagement with said first reverse fold.

7. The method of claim 5 wherein said transverse strip is separated from said tape as it is cut therefrom, and then the fold on the end of said strip is engaged by a raised portion on the outer surface of said rotating member to pull the separated strip onto said outer surface.

8. The method of claim 5 wherein said cut strip is maintained on the outer surface of said rotating member by subjecting it to a pressure differential, and wherein said pressure differential is removed as said strip approaches, said article to allow it to be placed thereon.

9. A method of applying a strip of tape having a thermoplastic adhesive layer to a relatively flat moving blank, comprising the steps of:

advancing the tape longitudinally along a predetermined path, folding one side edge portion of the tape reversely upon itself as it is advancing to form a fold therein in engagement with the surface of said tape opposite to said adhesive layer, shearing a transverse strip from the leading portion of said tape while its advancement is temporarily stopped, said strip having the tape fold disposed at one end thereof, engaging said folded end of the cut strip with a raised portion on the outer surface of a rotating wheel to pull the strip thereon, with the adhesive layer of said strip facing outwardly from said wheel.

maintaining said strip on the outer surface of said wheel and simultaneously moving said tape through a circular path on said wheel surface toward said moving blank, heating said moving blank to a predetermined temperature before said tape is advanced on said wheel to a position adjacent thereto, and releasing said tape strip from the outer surface of said wheel and simultaneously placing said tape strip in a predetermined position on said heated blank with said thermoplastic adhesive layer in engagement therewith to adhere said tape strip to said blank.

10. The method of claim 9 wherein said blank is heated to a temperature sufficient to soften said tehrmoplastic adhesive layer on said tape strip, and wherein said tape strip is thereafter pressed into tight engagement with said blank.

11. The method of claim 9 wherein said side edge portion of said tape is folded into a double reverse fold, and wherein said fold is lifted from said tape strip after it is positioned on said blank, to enable the portion of said strip under said fold to be heated and tightly pressed into engagement with said blank.

12. The method of claim 11 wherein said fold is again pressed into engagement with said tape strip after the portion of said strip under said fold is so pressed into engagement with said blank.

13. A method of applying a strip of tape to an article moving along a generally linear path, comprising the steps of:

advancing the tape along a predetermined path which is substantially parallel to the longitudinal axis thereof, reversely folding one side edge portion of the tape as it is so advancing, shearing a transverse strip from the leading portion of said tape while its advancement is temporarily stopped, said strip having the tape fold disposed at one end thereof, engaging said folded end of the cut strip and conveying it toward said moving article in a circular path about an axis which is substantially parallel to the direction of advancement of the leading portion of the tape, and placing said tape strip in a predetermined position on said article as they are both moving in a common direction.

14. The method of claim 13 wherein the folded end of the cut strip is engaged by a raised portion on the outer surface of a wheel rotating about said axis to pull said tape strip onto said wheel for rotation therewith.

15. A method of forming a sealing strip having a pull tab formed integral therewith, comprising the steps of:

longitudinally advancing a web of tape having a width in excess of the desired effective sealing length of the strip, folding a side edge portion of said web out of the plane of the adjacent portion of said web, and cutting said web transversely to form it into individual sealing strips, each of which contains a folded side edge portion as a pull tab.

16. The method of claim 15 wherein at least a portion of said folded side edge portion is reversely folded through an agle of approximately 180°.

17. The method of claim 16 wherein another portion of said folded side edge portion is reversely folded back upon said first named folded portion through an angle of approximately 180° to form a double thickness pull tab.

18. Apparatus for applying a strip of tape to an article, comprising:

means for advancing the tape along a predetermined path, means disposed adjacent one side edge portion of the tape for forming a fold therein as the tape is being advanced, means for stopping the forward advance of the folded tape, means for cutting a transverse strip having the tape fold at one end thereof from the tape when the advancement thereof is stopped, and means disposed adjacent said cutting means for engaging the folded end of the cut strip and for conveying the strip towards said article to position it thereon.

19. The apparatus of claim 18 wherein said advancing means comprise a first pair of continuously driven counterrotating rolls which engage said tape and move it into a loop, and a second pair of intermittently driven, counterrotating rolls which engage a portion of the tape beyond the loop to intermittently move the tape out of the loop and towards said cutting means.

20. The apparatus of claim 18 wherein said folding means comprise a support table over which said tape is advanced, said one side edge portion of said tape extending beyond the adjacent edge of said table, and a plurality of rollers disposed on one side of said table for engagement with said one edge portion of said tape as it is being advanced to fold it around said table edge.

21. The apparatus of claim 18 wherein said stopping means comprise a gauge member mounted adjacent said cutting means and so positioned as to be engaged by the leading end of the tape as it is being intermittently advanced by said second pair of rolls.

22. The apparatus of claim 21 wherein said cutting means comprises a reciprocating cutting member which shears said strip from said tape when the leading end of said tape engages said gauge member.

23. The apparatus of claim 18 wherein said tape strip engaging and conveying means comprises a rotating member having a projection on its outer surface which engages the strip fold and pulls the strip thereon for rotation therewith.

24. In an apparatus for forming a tape strip and applying it to an article on a moving conveyor, means for advancing the tape from a supply thereof along a predetermined path which is substantially parallel to the longitudinal axis of said tape, means disposed adjacent one side edge portion of said tape for forming a reverse fold therein as it is being advanced, means for temporarily stopping the forward advance of said tape after it is so folded by said folding means, means for shearing a transverse strip having the reverse fold on one end thereof from the leading portion of the tape when it is temporarily stopped, and means disposed between said shearing means and the article conveyor for engaging said strip end fold and for conveying said strip to a predetermined position on the article as it is moving on the conveyor.

25. The apparatus of claim 24 wherein said folding means comprise a support table over which said tape is disposed, said one side edge portion of said tape extending beyond the adjacent edge of said table, a plurality of rollers disposed on one side of said table for engagement with said one edge portion of said tape to fold it around said table edge, and a cam member disposed on the other side of said table for engaging said folded tape edge portion to reform it into a predetermined configuration.

26. The apparatus of claim 24 wherein said tape stopping means comprise a pair of intermittently driven counter-rotating rolls which engage the leading portion of said tape and intermittently advance it toward said shearing means.

27. The apparatus of claim 26 wherein said shearing means comprise a reciprocating cutting member which is driven in synchronization with said intermittently driven rolls to engage and transversely cut the leading portion of said tape each time its intermittent advancement by said rolls is stopped.

28. The apparatus of claim 24 wherein said tape strip conveying means comprises a rotating wheel having a projection on the outer surface thereof for engaging the end fold of said tape strip to pull it onto said outer surface, and wherein said wheel is provided with means for creating a pressure differential across the outer surface thereof to retain said tape strip thereon as it is rotated therewith.

29. The apparatus of claim 28 wherein said wheel is so constructed as to cut off said pressure differential creating means when said strip approaches the moving article to allow said strip to be transferred thereto.

30. In an apparatus for forming strips of tape having an adhesive layer on one surface thereof and for applying and adhering the tape strips to blanks on a moving conveyor, a drive assembly for advancing the tape from a supply roll along a predetermined path which is substantially parallel to the longitudinal axis of the tape, a folding assembly disposed adjacent one side edge portion of the tape for forming a reverse fold therein as it is begin advanced, said reverse fold being adjacent the surface of said tape opposite to the adhesive layer thereof, an assembly for intermittently stopping the forward advance of the tape after it is so folded by said folding assembly, a cutting assembly for shearing a transverse strip having said reverse fold on one end thereof from the leading portion of the tape each time it is stopped by said intermittent stopping means, a rotating wheel disposed between said cutting asssembly and the blank conveyor and having a radially extending projection formed on the outer surface thereof which engages the end fold of a cut tape strip to advance it onto said wheel surface for rotation with said wheel toward said blank conveyor, said tape strip having the adhesive layer thereof facing outwardly from said wheel, said wheel having the outer surface thereof in communication with a source of vacuum to enable a pressure differential to be created across the tape strip on the outer wheel surface to retain it thereon as it is being conveyed from said cutting assembly to a blank on the conveyor, and means for pressing said tape strip into engagement with said blank to adhere it thereto.

31. The apparatus of claim 30 wherein said folding assembly comprises a table for supporting said tape on one surface thereof, said table being of less width than said tape so that said one side edge portion of said tape extends beyond the edjacent edge of the table, a roller disposed on one side of said table for engaging said one edge portion of the tape to fold it around said table edge into a first fold, a first cam member disposed on the opposite side of said table for bending said first fold around said table edge and into engagement with the opposite surface of said table and for forming the end of said first fold into a second fold extending transversely therefrom, and a second cam member for pressing said second fold into engagement with said first fold to form a double reverse fold in said one edge portion of the tape.

32. The apparatus of claim 30 wherein said assembly for intermittently stopping the forward advance of the folded tape comprises a pair of counter-rotating rolls which engage the tape and intermittently advance it toward said cutting assembly, and a guage plate mounted adjacent said cutting assembly and so positioned as to be engaged by the leading end of the tape as it is intermittently advanced by said rolls.

33. The apparatus of claim 32 wherein said cutting assembly comprises a reciprocating cutting member which is driven in synchronization with said intermittently driven rolls to engage and transversely cut the leading portion of the tape after it engages said guage member.

34. The apparatus of claim 30 wherein said pressing means comprises a rotating member mounted adajcent said wheel and said blank conveyor for pressing said tape strip into tight engagement with a blank between said rotating member and said wheel.

35. Apparatus for cutting a strip from a tape having a fold in one side edge portion thereof and for conveying the cut strip to a predetermined point, comprising:

a pair of counter-rotating rolls in engagement with the tape for intermittently advancing it along a path which is substantially parallel to its longitudinal axis, a gauge member so positioned as to be engaged by the leading end of the tape each time it is intermittently advanced by said rolls, a reciprocating cutting member disposed adjacent said gauge member for shearing a transverse strip having the tape fold at one end thereof from the leading end of the tape as it engages said gauge member, and a rotating member for engaging the fold at one end of the cut strip to convey said strip to said predetermined point.

36. The apparatus of claim 35 wherein said rotating member comprises a wheel having a generally radially extending member comprises a wheel having a generally radially extending projection on the surface there which engages said cut strip fold to pull said strip onto said outer surface for rotation with said wheel toward said predetermined point.

37. The apparatus of claim 36 wherein a support member is disposed adjacent said gauge member and said cutting member for supporting the leading portion of said tape, said support member having a recessed platform disposed beneath said cutting member to receive said transverse strip thereon as it is sheared from the tape by said cutting member, said recessed platform being disposed above and adjacent to the outer surface of said wheel and being shorter than said cut strip so that the folded end of the strip falls onto said outer wheel surface after the strip is cut from the tape.

38. Apparatus for forming a tape strip having a thermoplastic adhesive on one surface thereof and for applying it to a relatively flat blank on a conveyor, comprising:

means for continuously advancing the tape from a supply thereof along a path which is substantially parallel to the longitudinal axis of the tape, a table for supporting said tape on one surface thereof, said table being disposed between the tape supply and said continuous advancing means and being of less width than said tape so that one side edge portion of the tape extends beyond the table, folding means disposed adjacent said one side edge portion of the tape for folding it around the adjacent table edge to form a reverse fold therein which is disposed adjacent the surface of the tape opposite to that having the thermoplastic adhesive layer thereon, a cutting assembly, means for intermittently advancing the folded portion of the tape toward said cutting assembly, gauging means disposed adjacent said cutting assembly for engaging the leading end of the folded tape as it is intermittently advanced, said cutting assembly comprising a reciprocating cutting member which is driven in synchronization with said intermittent advancing means so as to cut a transverse strip from the leading end of said folded tape each time it is intermittently advanced into engagement with said gauging means, said strip having the tape fold at one end thereof, a rotating wheel mounted between said cutting assembly and blank conveyor and having a projection on the outer surface thereof for engaging the fold at one end of the cut strip to pull it onto said wheel for rotation therewith toward the blank conveyor, said adhesive layer of said strip facing outwardly of said wheel, means for creating a pressure differential across the tape strip on said outer wheel surface to retain it thereon as said wheel is rotating, means for heating the blank on the conveyor to a temperature sufficient to soften said thermoplastic tape strip layer, and means for pressing said tape strip adhesive layer into engagement with said heated blank to adhere said tape strip thereto.

39. The apparatus of claim 38 further comprising means for lifting said fold from said tape strip after said strip is transferred onto said blank, means for heating the portion of said tape strip disposed under said fold and for pressing said tape strip portion into tight engagement with said blank, and means for returning said fold to its original position over said tape strip portion.

40. The apparatus of claim 38 wherein said folding means comprises a pair of rollers disposed on one side of said support table for engaging said one edge portion of the tape to gradually fold it around said table edge into a first fold, a first cam member disposed on the opposite side of said support table and having a cam slot therein for receiving said first fold for gradually bending it around said table edge and into engagement with the opposite surface of said table and for forming the end of said first fold into a second fold extending transversely therefrom, the portion of said table extending beyond said first cam member in the direction of advancement of said tape being provided with a longitudinal recess in said edge thereof, a plurality of rollers disposed on one side of said table recess, and a second cam member disposed adjacent said plurality of rollers and on the other side of said recess for pressing said second transverse fold into engagement with said first fold to form a double reverse fold in said one edge portion of the tape as it is advanced between said plurality of rollers and said second cam member.

41. The method of applying a strip of tape having an adhesive face and a non-adhesive face to a flat container blank having a slit adjacent to a side edge thereof comprising the steps of:

advancing the tape in the direction of its longitudinal axis, folding one side edge portion of the tape as it is advancing so that, within the fold, the adhesive face contacts itself, cutting a transverse strip from the leading portion of the tape, said strip having a folded end portion, placing said strip on said blank to completely cover said slit, adhering the unfolded portion of said strip to said blank, the folded end portion remaining unadhered to said blank to provide a pull tab for removing said strip.

42. The method defined in claim 41 wherein said adhesive is thermoplastic and said adhering step is performed by heating.

43. The method defined in claim 41 wherein said end portion of said strip is folded into a double reverse fold so that at one level the adhesive face contacts itself and at another level the non-adhesive face contacts itself.

References Cited

UNITED STATES PATENTS

| | | | |
|---|---|---|---|
| 1,943,538 | 1/1934 | Kahn | 229—51 |
| 2,474,770 | 6/1949 | Yount et al. | |
| 2,543,220 | 2/1951 | Ardell. | |
| 2,861,022 | 11/1958 | Lundsager | 156—322 XR |
| 2,865,261 | 12/1958 | Seragnoli | 93—1 |
| 2,984,289 | 5/1961 | Borkmann | 156—521 |
| 3,047,934 | 8/1962 | Magner. | |
| 3,109,576 | 11/1963 | Karl | 229—51 |

BERNARD STICKNEY, *Primary Examiner.*